(12) United States Patent
Schaafsma et al.

(10) Patent No.: US 12,323,818 B2
(45) Date of Patent: Jun. 3, 2025

(54) SYSTEMS AND METHODS FOR NETWORK BASED GEOGRAPHIC ANCHOR SELECTION

(71) Applicant: Verizon Patent and Licensing Inc., Basking Ridge, NJ (US)

(72) Inventors: Sasha Faye Schaafsma, Twin Lake, MI (US); Charles Aaron Robeck, Byron, MN (US); Timothy E. Coyle, Chicopee, MA (US); Brandon Scott Atkins, Evans, GA (US); Zachary S. Wozich, Casco, ME (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 559 days.

(21) Appl. No.: 17/713,451

(22) Filed: Apr. 5, 2022

(65) Prior Publication Data

US 2023/0319583 A1 Oct. 5, 2023

(51) Int. Cl.
*H04W 16/18* (2009.01)
*H04W 64/00* (2009.01)

(52) U.S. Cl.
CPC ......... *H04W 16/18* (2013.01); *H04W 64/003* (2013.01)

(58) Field of Classification Search
CPC ... H04W 16/18; H04W 64/003; H04W 24/02; H04W 76/16
See application file for complete search history.

(56) References Cited

U.S. PATENT DOCUMENTS

| | | | |
|---|---|---|---|
| 2007/0159986 A1* | 7/2007 | Park | H04W 64/00 370/254 |
| 2012/0026940 A1* | 2/2012 | Barbieri | H04W 24/10 370/328 |
| 2014/0256353 A1* | 9/2014 | Denis | H04W 64/00 455/456.1 |
| 2014/0287776 A1* | 9/2014 | Denis | G01S 5/021 455/456.1 |
| 2015/0045088 A1* | 2/2015 | Chen | H04W 76/12 455/525 |
| 2016/0116274 A1* | 4/2016 | Meredith | G01C 21/20 702/150 |
| 2019/0239181 A1* | 8/2019 | Gangakhedkar | H04W 64/00 |
| 2021/0297922 A1* | 9/2021 | Bhatti | H04W 64/003 |
| 2021/0337447 A1* | 10/2021 | Yang | H04W 40/36 |
| 2022/0104297 A1* | 3/2022 | Sanders | H04W 80/02 |
| 2022/0110088 A1* | 4/2022 | Bao | G01S 5/0205 |
| 2024/0118370 A1* | 4/2024 | Duan | G01S 5/0244 |

FOREIGN PATENT DOCUMENTS

CN 113905324 B * 11/2023 ............ H04W 16/14

* cited by examiner

*Primary Examiner* — Liem H. Nguyen

(57) ABSTRACT

A method may include identifying, in a network, a location of a Fifth Generation (5G) node and determining, based on the location of the 5G node and capabilities associated with the 5G node, a number of areas around the 5G node, wherein each area corresponds to a bin. The method may also include identifying, in at least some of the of bins, candidate anchor nodes for the 5G node and ranking the candidate anchor nodes based on parameters associated with the candidate anchor nodes. The method may further include selecting, for the 5G node, an anchor node from the candidate anchor nodes based on the ranking.

20 Claims, 7 Drawing Sheets

| BIN 2 | BIN 3 | BIN 4 |
|---|---|---|
| BIN 1 | BIN 0 HOME | BIN 5 |
| BIN 8 | BIN 7 | BIN 6 |

FIG. 4

SYSTEMS AND METHODS FOR NETWORK BASED GEOGRAPHIC ANCHOR SELECTION

BACKGROUND INFORMATION

User devices associated with a Fifth Generation (5G) New Radio (NR) system may have the capability to communicate via a 5G network, as well as communicate via other networks, such as a Fourth Generation Long Term Evolution (4G LTE) network. For example, an Evolved Universal Terrestrial Radio Access New Radio Dual Connectivity (EN-DC) device has the capability to exchange data with a 4G LTE base station (e.g., an eNode B), as well as exchange data with a 5G next generation base station (e.g., a gNode B).

However, for a 5G base station to use existing 4G architecture for communications, the 5G base station may need to anchor to a 4G base station. Selecting an appropriate anchor station for a 5G base station is typically based on identifying a 4G base station located closest to the 5G base station.

BRIEF DESCRIPTION OF THE DRAWINGS

FIG. 4 illustrates a home bin and surrounding bins in accordance with an exemplary implementation;

DETAILED DESCRIPTION OF EXAMPLE EMBODIMENTS

The following detailed description refers to the accompanying drawings. The same reference numbers in different drawings may identify the same or similar elements. Also, the following detailed description does not limit the invention.

Implementations described herein relate to selecting an anchor station for a 5G base station using call records and other metrics associated with 4G base stations located in areas near a 5G base station. For example, in one implementation, a geographic service area associated with a telecommunications service provider may be divided into a grid (e.g., using the Military Grid Reference System (MGRS)) and then subdivided into smaller sections or areas, referred to as geobins or bins. A footprint associated with the radio frequency (RF) capability for the 5G base station may then be used to identify bins and 4G LTE base stations, located in the bins, that may be candidate anchor stations. For each of the identified candidate anchor stations, user equipment (UE) call records are analyzed to determine "hit counts" associated with a number of communications handled by a particular candidate anchor station, signal strength measurements associated with calls handled by the candidate anchor station, and a distance from the candidate anchor station to the 5G node, as well as other metrics.

An anchor station for a 5G base station may then be selected based on a ranking of the candidate anchor stations. In some implementations, additional factors may be considered when selecting the anchor station. For example, factors such as whether the 5G base station and 4G LTE base station are collocated (i.e., located at the same location), physical cell identifier (PCI) collision avoidance, or other factors may be considered when selecting an anchor station for a 5G base station to further facilitate the selection of the anchor station.

Figure 1:
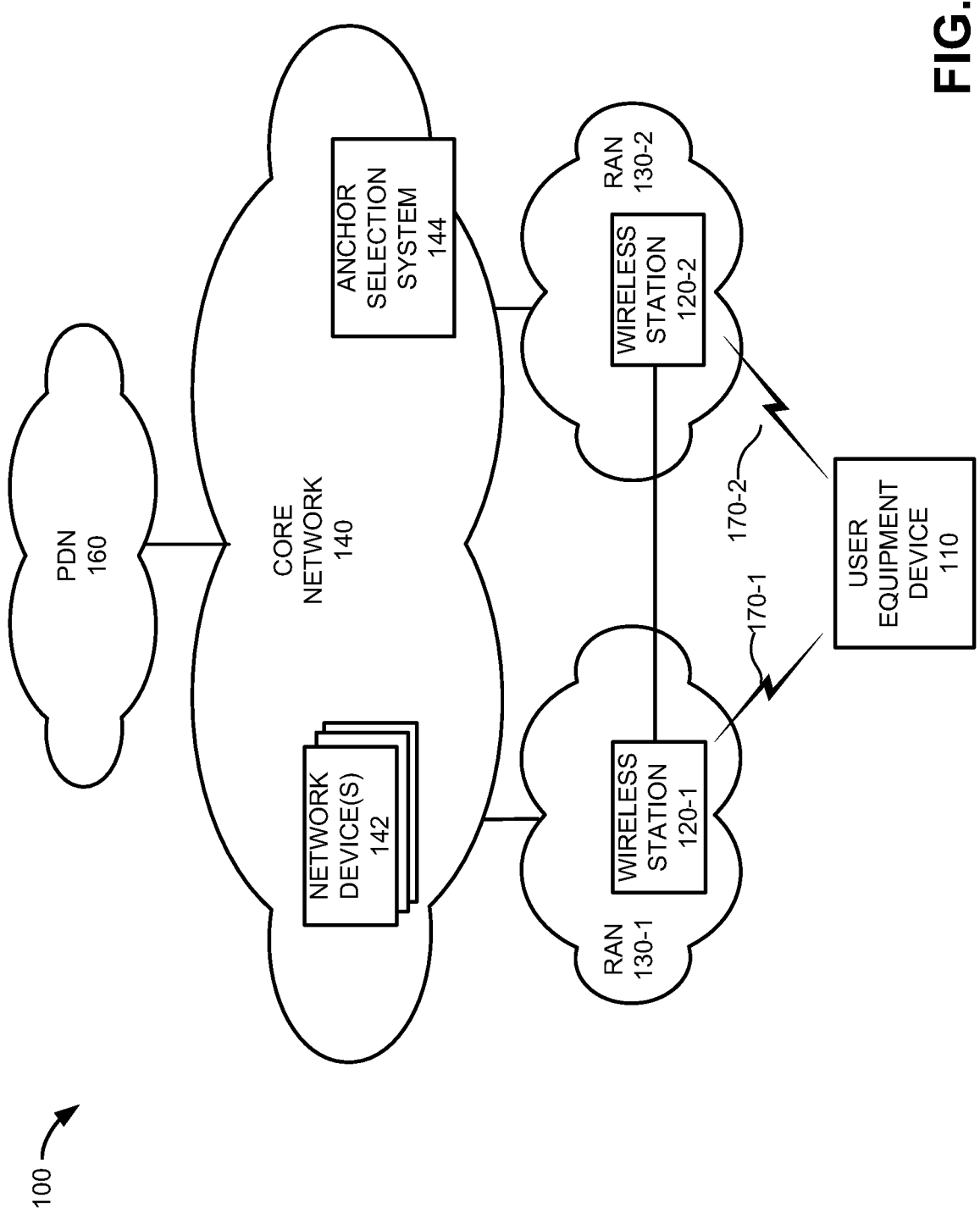
FIG. 1 illustrates an exemplary environment in which systems and methods described herein may be implemented.

FIG. 1 is a diagram of an exemplary environment 100 in which systems and methods described herein may be implemented. Referring to FIG. 1, environment 100 includes user equipment (UE) device 110, wireless station 120-1 associated with radio access network (RAN) 130-1, wireless station 120-2 associated with RAN 130-2, core network 140, network devices 142, anchor selection system 144, and packet data network (PDN) 160. Wireless stations 120-1 and 120-2 may be referred to herein collectively as wireless stations 120 and individually as wireless station 120 or 120-X, and RANs 130-1 and 130-2 may be referred to herein collectively as RANs 130 and individually as RAN 130 or 130-X. In other embodiments, environment 100 may include additional networks, fewer networks, and/or different types of networks than those illustrated and described herein.

In the configuration illustrated in FIG. 1, UE device 110 may use wireless channels 170-1 and 170-2 (referred to collectively as wireless channels 170) to access wireless stations 120-1 and 120-2, respectively. Wireless channels 170 may correspond, for example, to a physical layer in accordance with different radio access technology (RAT) types. For example, wireless channel 170-1 may correspond to the physical layer associated with 4G or 4.5G RAN standards (e.g., 3GPP standards for 4G and 4.5G air interfaces, collectively referred to herein as "4G"), while wireless channel 170-2 may correspond to the physical layer associated with 5G New Radio standards (e.g., 3GPP standards for 5G air interfaces).

UE device 110 (also referred to herein as UE 110 or user device 110) may include any type of mobile device having multiple coverage mode capabilities (e.g., EN-DC capabilities) and is able to communicate with different wireless stations (e.g., wireless stations 120-1 and 120-2) using different wireless channels (e.g., channels 170-1 and 170-2) corresponding to different RANs (e.g., RANs 130-1 and 130-2). UE device 110 may be a mobile device that may include, for example, a cellular radiotelephone, a smart phone, a tablet, any type of internet protocol (IP) communications device, a Voice over Internet Protocol (VoIP) device, a personal computer (PC), a laptop computer, a notebook, a netbook, a wearable computer (e.g., a wrist watch, eye glasses, etc.), a gaming device, a media playing device, a digital camera that includes communication capabilities (e.g., wireless communication mechanisms such as Wi-Fi), etc. In other implementations, UE device 110 may include a machine-type communications (MTC) device, an Internet of Things (IoT) device, a machine-to-machine (M2M) device, etc.

UE device 110 may connect to RANs 130 and other devices in environment 100 via any conventional technique, such as wired, wireless, optical connections or a combination of these techniques. UE device 110 and the person associated with UE device 110 (e.g., the party holding or using UE device 110) may be referred to collectively as UE device 110 in the description below.

Wireless stations 120 may each include a network device that has computational and wireless communication capabilities. Wireless stations 120 may each include a transceiver system that connects UE device 110 to other components of RAN 130 and core network 140 using wireless/wired interfaces. Wireless stations 120 may be implemented as a base station (BS), a base transceiver station (BTS), a Node B, an evolved Node B (eNode B), an evolved LTE (eLTE) eNB, a next generation Node B (gNode B), a remote radio head (RRH), an RRH and a baseband unit (BBU), a BBU, or other type of wireless node (e.g., a picocell node, a femtocell node, a microcell node, etc.) that provides wireless access to one of RANs 130. Each wireless station 120 may support a RAN 130 having different RAT types. For example, in one implementation, RAN 130-1 may include an E-UTRAN for an LTE network, while RAN 130-2 may include a 5G NR RAN as well as an E-UTRAN for an LTE network. For example, RAN 130-2 may be configured to support communications via both LTE and 5G networks.

Core network 140 may include one or multiple networks of one or multiple types. For example, core network 140 may be implemented to include a terrestrial network and/or a satellite network. According to an exemplary implementation, core network 140 includes a network pertaining to multiple RANs 130. For example, core network 140 may include the core part of an LTE network, an LTE-Advanced network, a 5G network, a legacy network, etc.

Depending on the implementation, core network 140 may include various network elements that may be implemented in network devices 142. Such network elements may include a mobility management entity (MME), a user plane function (UPF), a session management function (SMF), a core access and mobility management function (AMF), a unified data management (UDM), a PDN gateway (PGW), a serving gateway (SGW), a policy control function (PCF), a home subscriber server (HSS), as well other network elements pertaining to various network-related functions, such as billing, security, authentication and authorization, network polices, subscriber profiles, network slicing, and/or other network elements that facilitate the operation of core network 140.

Core network 140 may also include anchor selection system 144. Anchor selection system 144 may include one or more computing devices that receive inputs regarding call data in environment 100, signal strength measurements (e.g., Reference Signal Received Power (RSRP)), distance information from a candidate 4G LTE node to a particular 5G base station, as well as other information. Anchor selection system 144 may use this information to select a 4G anchor station for a 5G base station in environment 100, as described in detail below.

PDN 160 may include one or more networks, such as a local area network (LAN), a wide area network (WAN), a metropolitan area network (MAN), a telephone network, the Internet, etc., capable of communicating with UE device 110. In one implementation, PDN 160 includes a network that provides data services (e.g., via packets or any other Internet protocol (IP) datagrams) to UE device 110.

The number and arrangement of devices in environment 100 are exemplary. According to other embodiments, environment 100 may include additional devices (e.g., thousands of UE devices 110s, hundreds of wireless stations 120, dozens of RANs, multiple anchor selection systems 144, etc.) and/or differently arranged devices, than those illustrated in FIG. 1. Environment 100 may also include elements, such as gateways, monitoring devices, network elements/functions, etc. (not shown), that aid in providing data services and routing data in environment 100.

Various functions are described below as being performed by particular components in environment 100. In other implementations, various functions being described as being performed by one device may be performed by another device or multiple other devices, and/or various functions described as being performed by multiple devices may be combined and performed by a single device.

Figure 2:
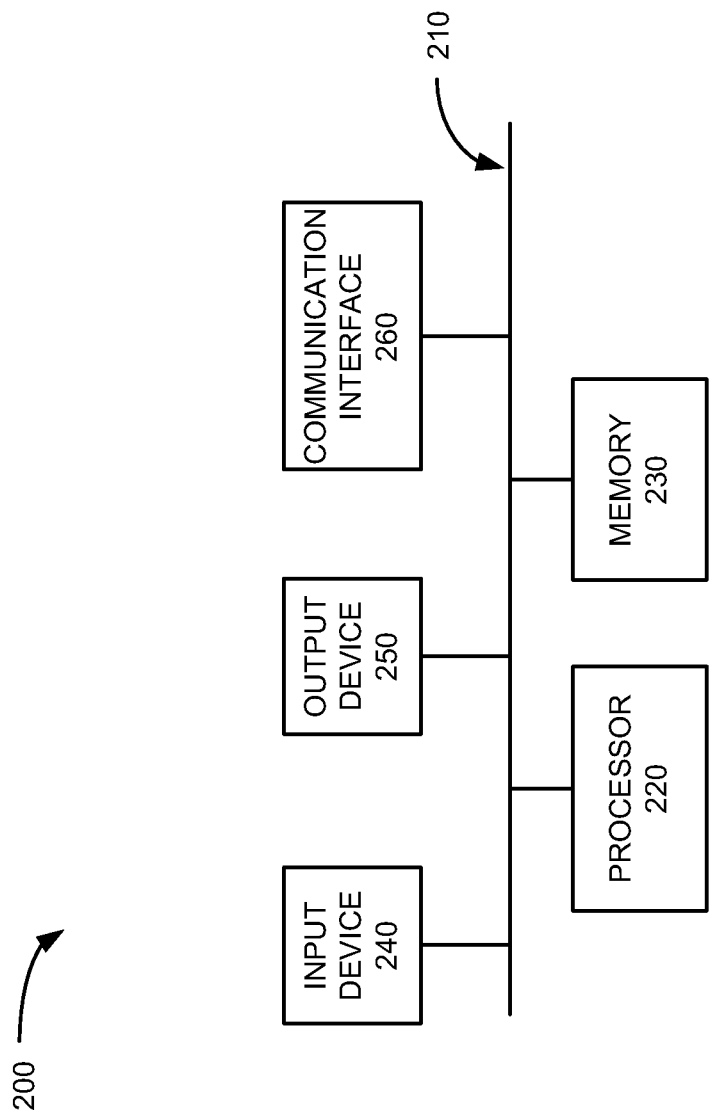
FIG. 2 is a block diagram of components implemented in one or more of the devices of the environment of FIG. 1 in accordance with an exemplary implementation.

FIG. 2 illustrates an exemplary configuration of a device 200. One or more devices 200 may correspond to or be included in devices in environment 100, such as UE device 110, wireless station 120, network device 142, anchor selection system 144 and/or other devices included in environment 100. Referring to FIG. 2, device 200 may include bus 210, processor 220, memory 230, input device 240, output device 250 and communication interface 270. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, a touch screen display may act as both an input device and an output device.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data via links 170. Communication interface 260 may also include a modem or an Ethernet interface to a LAN or other mechanisms for communicating with elements in a network, such as RAN 130 or another network.

The exemplary configuration illustrated in FIG. 2 is provided for simplicity. It should be understood that device 200 may include more or fewer devices than illustrated in FIG. 2. In an exemplary implementation, device 200 perform operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
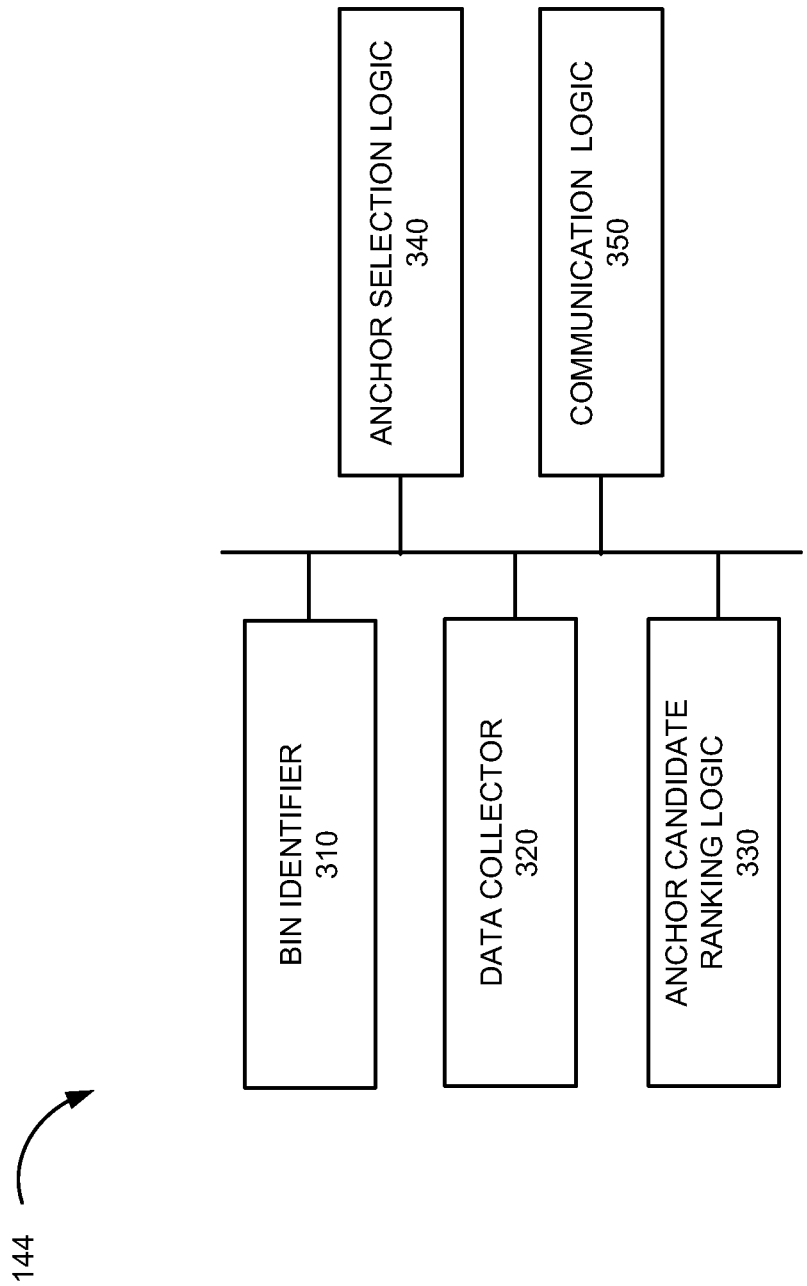
FIG. 3 illustrates logic components implemented in the anchor selection system of FIG. 1 in accordance with an exemplary implementation.

FIG. 3 is a functional block diagram of components implemented in anchor selection system 144 in accordance with an exemplary implementation. In one implementation, all or some of the components illustrated in FIG. 3 may be implemented by processor 220 executing software instructions stored in memory 230. In other implementations, all or some of the components illustrated in FIG. 3 may be implemented in hardware or a combination of hardware, firmware and software used to perform the functionality described below.

Anchor selection system 144 may include bin identifier 310, data collector 320, anchor candidate ranking logic 330, anchor selection logic 340 and communication logic 350. In alternative implementations, these components or a portion of these components may be located externally with respect to anchor selection system 144.

Bin identifier 310 may include logic to identify a "home" geobin (also referred to as a home bin) corresponding to the location of a 5G wireless station 120. For example, in one implementation, the Military Grid Reference System (MGRS) may be used to aid in formatting an area associated with a telecommunications service provider into a plurality of bins. The MGRS divides the entire Earth's surface into 100 kilometer (km)×100 km squares/blocks. The MGRS uses three digits to identify a particular grid zone, followed by two digits to identify 100,000 square meter blocks within the zone. Locations within each grid zone may be identified using five digits to identify an east-west position within the zone and five digits to identify a north-south position within the zone.

In an exemplary implementation, anchor selection system 144 may use MGRS bins that are smaller than the 100 km×100 km squares described above, such as MGRS bins having a size of 100 meters (m)×100 meters. For example, FIG. 4 illustrates a portion of a telecommunications service provider's service area that includes nine bins, with each bin having a 100 m×100 m size. It should be understood that the actual bin size may be greater or smaller than 100 m×100 m, depending on the particular implementation. In FIG. 4, bin 0 represents a home bin (e.g., a bin in which a 5G wireless station 120, also referred to herein as a 5G node, is located) and bins 1-8 represent surroundings 100 m×100 m bins that may include a 4G LTE wireless station 120 (also referred to as a 4G node).

In this example, bin 0 is identified based on the known location of a 5G wireless station 120 deployed in environment 100. Bin identifier 310 may then identify a number of bins in proximity or surrounding home bin 0. For example, bin identifier 310 may identify the surrounding bins based on the radio frequency (RF) footprint or RF capabilities/parameters associated with the 5G node, including the orientation, azimuth and beamwidth associated with one or more antennas included in the 5G node and signals transmitted by the 5G node.

Figure 5:
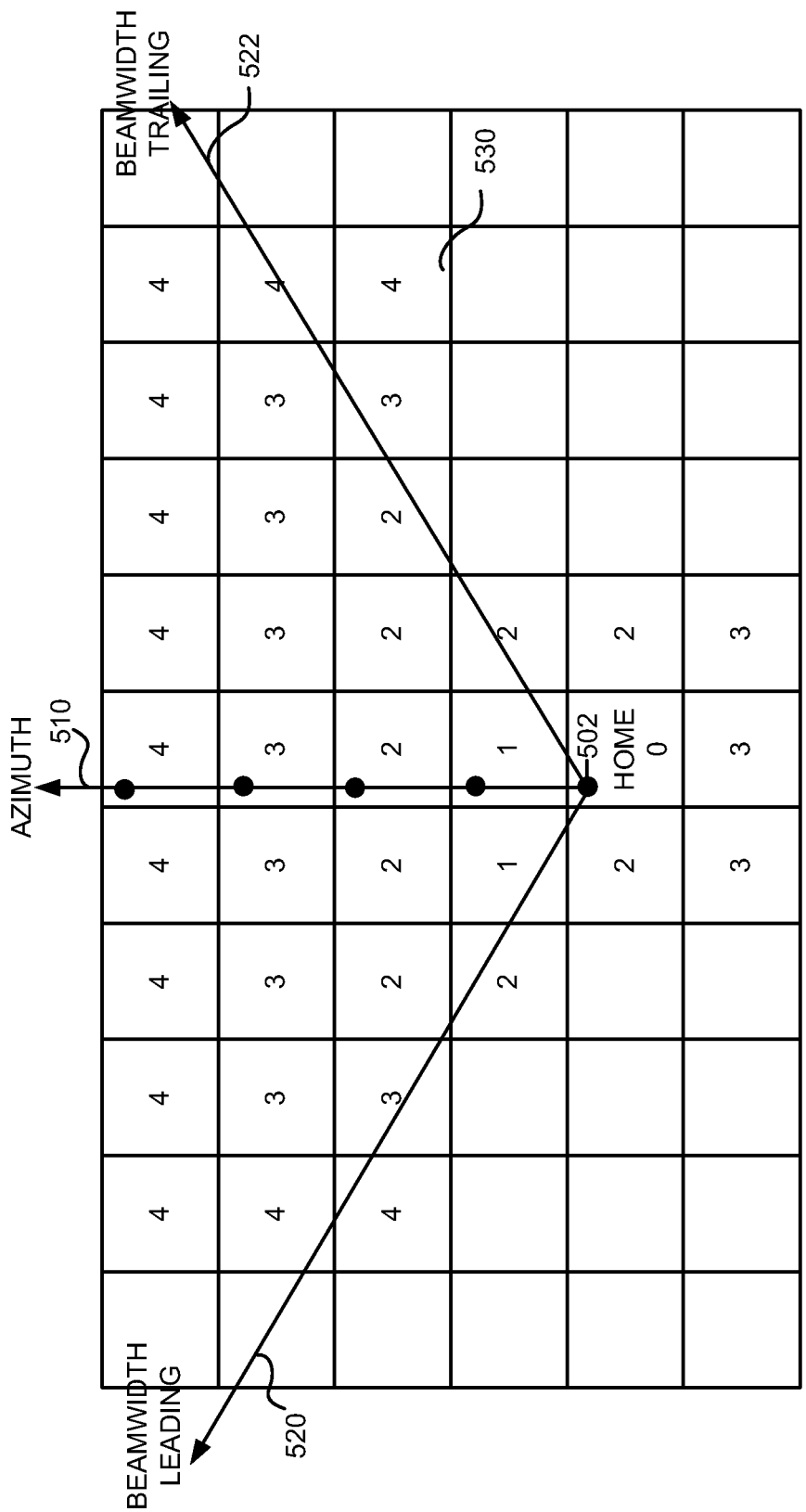
FIG. 5 illustrates the identification of bins based on radio frequency capabilities of a 5G base station in accordance with an exemplary implementation.

In one implementation, bin identifier 310 may generate an area or arc that falls within the azimuth and beamwidth associated with signals transmitted by the 5G node to identify candidate bins. One or more of the bins/areas may include candidate 4G LTE nodes that may act as anchor stations for the 5G node. For example, FIG. 5 illustrates home bin 0 with a 5G node 502. As illustrated, the azimuth associated with the 5G node is labeled 510. The leading and trailing beamwidths associated with the beams transmitted by 5G node 502, labeled 520 and 522, respectively, are identified based on the overall beamwidth and are located in either direction from the azimuth. For example, the azimuth angle associated with 5G node 502 plus or minus the beamwidth of 5G node 502 in angular degrees divided by two (e.g., azimuth+/−beamwidth/2) may identify a primary arc located between lines 520 and 522 in which bins are identified. That is, bins located between beamwidth leading line 520 and beamwidth trailing line 522 may be identified, as illustrated in FIG. 5.

Bin identifier 310 may then identify bins in tiers based on the distance from the home bin 0, where bins in the first tier that are located closest to the home bin and located in a forward direction with respect to the leading and trailing beamwidth lines 520 and 522 are labeled with "1"; the bins located in the second tier within the beamwidth are labeled with "2"; etc., up though bins in the fourth tier being labeled with "4." It should be understood that additional tiers of bins may be identified based on the RF capabilities of 5G node 502. For example, bin identifier 310 may traverse the surrounding RF footprint of 5G node 502 in a recursive manner to identify bins within the footprint of 5G node 502. In addition, bins located behind home bin 0 may be associated with a lower tier (e.g., tier 3 in FIG. 5) based on the orientation of the antenna(s) in 5G node 502 facing away from these bins. In each case, the identified bins may then be used to locate potential candidate anchor stations, as described below.

Data collector 320 may include logic to obtain call related data associated with candidate nodes located in the identified bins. For example, data collector 320 may identify 4G nodes within the identified bins. Data collector 320 may then identify the number of communications (also referred to as hits or a hit count that correspond to voice calls, text communications, etc.) serviced by the identified 4G nodes located in the bins illustrated in FIG. 5 over a period of time (e.g., one day, several days, one week, one month, etc.). Data collector 320 may also identify key performance indicators (KPIs), such as signal strengths associated with the communications. For example, data collector 320 may identify RSRP measurements and/or quality measurements associated with communications serviced by each 4G LTE node. Data collector 320 may also identify the distance of each 4G LTE node from 5G node 502 in home bin 0, as well as other information associated with each 4G LTE node. This information may then be used for ranking the 4G LTE nodes, as described below.

Anchor candidate ranking logic 330 may rank the 4G candidate nodes located in the bins based on, for example, UE device call records, signal strengths, distance from 5G node 502, etc. In one implementation, the hit count or number of communications serviced by a 4G LTE node in a particular bin may be weighted more heavily than other factors, such as signal strength, signal quality, distance or other metrics. For example, the hit count may indicate that a particular 4G LTE node received a significant number of communications, which may indicate that the particular 4G node is an appropriate anchor node for 5G node 502 in environment 100, as described in detail below. In other implementations, other factors may be weighted more heavily or all the factors may be weighted equally based on the particular implementation.

Anchor selection logic 340 may include logic to select an anchor node for 5G node 502. For example, based on the rankings from anchor candidate ranking logic 330, anchor selection logic 340 may select the 4G LTE node having the highest ranking. In an exemplary implementation, other factors may also be used to identify the appropriate anchor node, such as whether a particular 4G LTE node is collocated with 5G node 502, frequency bands supported by the anchor station, whether the anchor station is capable of avoiding PCI conflicts between neighboring cells or stations, etc., as described below.

Communication logic 350 may include logic to communicate with devices in environment 100 via wired, wireless or optical mechanisms. For example, communication logic 350 may transmit data, such as anchor selection information to network personnel (not shown). Communication logic 350 may also receive information from devices in environment 100, such as devices in core network 140 providing information regarding hit counts, signal strengths, signal quality, distance information, other KPIs, etc. Communication logic 350 may also communicate with other devices in environment 100. For example, communication logic 350 may include one or more transceivers and one or more antennas for transmitting and receiving RF data, a modem or an Ethernet interface to a LAN or other mechanisms for communicating with elements in a network.

Although FIG. 3 shows exemplary components of anchor selection system 144, in other implementations, anchor selection system 144 may include fewer components, different components, differently arranged components, or additional components than depicted in FIG. 3. In addition, functions described as being performed by one of the components in FIG. 3 may alternatively be performed by another one or more of the components of anchor selection system 144.

Figure 6:
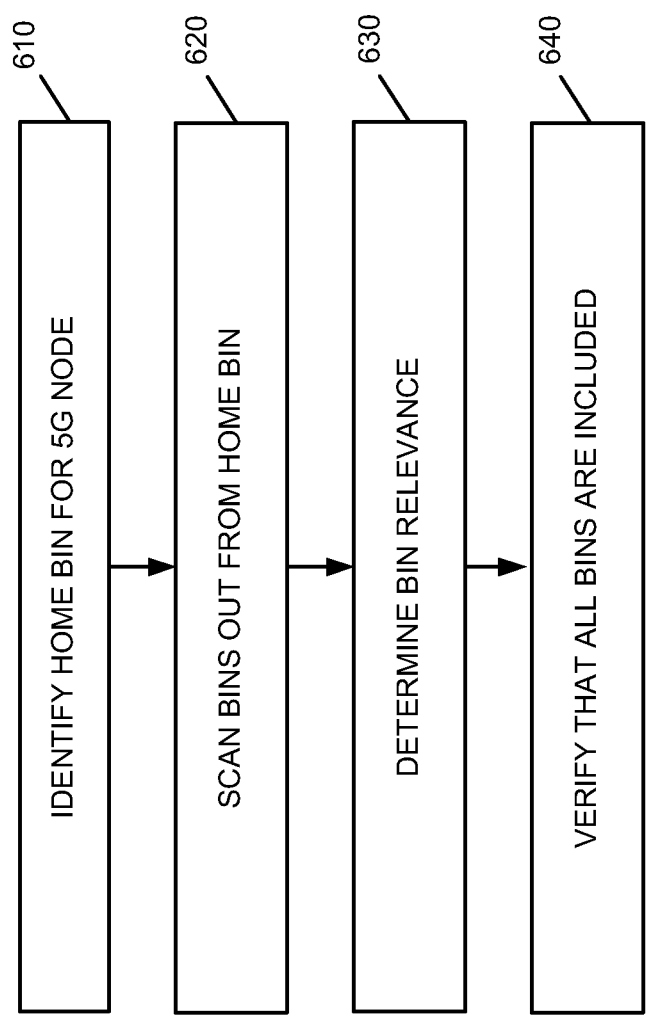
FIGS. 6 and 7 are flow diagrams illustrating processing by various components in the environment of FIG. 1 in accordance with an exemplary implementation.

FIG. 6 is a flow diagram illustrating processing associated with identifying bins associated with anchor selection in accordance with an exemplary implementation. Processing may begin with anchor selection system 144 identifying a home bin associated with a 5G node (block 610). For example, based on known locations of 5G nodes deployed in environment 100, anchor selection system 144 may identify a 100 m×100 m home bin using the sub-divided MGRS grid described above. For example, anchor selection system 144 may identify that the location of 5G node 502 is within the bin labeled as home bin 0 in FIG. 5.

Anchor selection system 144 may then fan out from home bin 0 based on the RF parameters associated with the 5G node to identify bins of interest (block 620). For example, as described above with respect to FIG. 5, bin identifier 310 may scan out from home bin 0 in tiers based on the azimuth and beamwidth of the 5G node. FIG. 5 illustrates identifying four adjacent tiers of bins, labeled as 1-4, with the node in tier 4 located along azimuth 510 and represented by a black circle being approximately 400 meters from 5G node 502. It should be understood that bin identifier 310 may identify more tiers of bins based on, for example, the RF capabilities (e.g., signal strength, azimuth and bandwidth) of 5G node 502.

Anchor selection system 144 may also identify bin relevance for each of the identified bins (block 630). For example, bin identifier 310 may determine if various bins are within tier 1, tier 2, tier 3 or tier 4 and/or within the beamwidth of 5G node 502 (e.g., between line 520 identified as beamwidth leading and line 522 identified as beamwidth trailing). If a particular bin is not within tiers 1-4 and/or outside the beamwidth, such bins maybe dropped from consideration. In other instances, a bin that is in relatively close proximity to being within the beamwidth of 5G node may be included as one of the identified bins, but may be identified as being in a different tier than adjacent bins that fall within the arc associated with the beamwidth. For example, bin 530 in FIG. 5 may be included as one of the identified bins, but may be identified as being in tier 4, as opposed to tier 2. Bin identifier 310 may then determine and/or verify that all relevant bins are included in the list of identified bins (block 640). For example, bin identifier 310 may determine that all bins located within a certain proximity of the RF beam footprint of the 5G node (e.g., within or close to within the arc between lines 520 and 522 in FIG. 5) are included in a list of bins that are candidates associated with an anchor node. Once the bins have been identified, anchor selection system 144 may identify candidate anchor stations located in the bins, as described in detail below.

Figure 7:
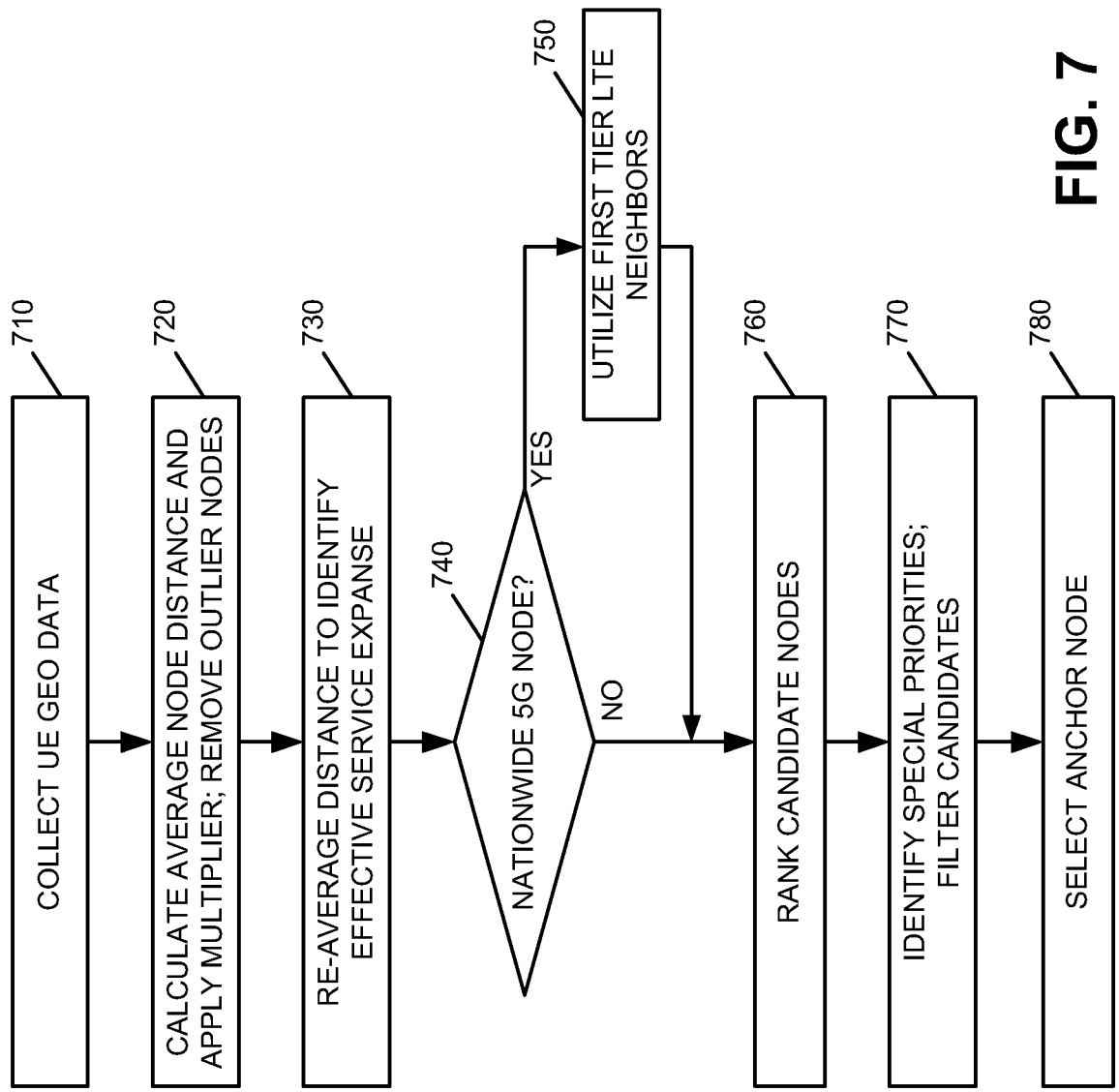

FIG. 7 is a flow diagram illustrating exemplary processing associated with selecting an anchor node for a 5G node in environment 100. Processing may begin with anchor selection system 144 collecting call-related data for the identified bins described above with respect to FIG. 6 (block 710). For example, data collector 320 may collect call records associated 4G LTE nodes located in the identified bins over a period of time, such as one day, several days, one week, one month, etc. The call records may include all communications made to a 4G LTE node in each identified bin. The call records may also include KPIs, such as signal strength measurements (e.g., RSRP), signal quality measurements (e.g., jitter, latency, delay, etc.) and/or other metrics associated with signals received by the 4G LTE node. Using the call records, data collector 320 may generate a hit count identifying the number of communications handled by each 4G LTE node over a period of time and various KPIs associated with the communications. The hit count may be used along with the KPIs to rank candidate nodes.

Anchor selection system 144 may also average the distance of all 4G LTE nodes from the 5G node (e.g., 5G node 502) (block 720). In one implementation, anchor candidate ranking logic 330 may then apply a multiplier to the average distance, such as a multiplier of 1.25, 1.5, etc. (block 720). For example, assume that the average distance from all the candidate anchor nodes to 5G node 502 is 10 miles and that the multiplier is 1.5, resulting in a modified distance of 15 miles (i.e., 10×1.5). In this case, anchor candidate logic 330 removes any 4G LTE nodes from consideration as the anchor station that are greater than 15 miles from 5G node 502 (block 720). The removed nodes may be too far from the 5G node to adequately function as an anchor node. Anchor candidate logic 330 may then re-average the distance of the 4G nodes from 5G node 502 based on the remaining 4G LTE nodes (i.e., the 4G LTE nodes that have not been removed from consideration) (block 730).

Anchor selection system 144 may also determine if the 5G node is part of a nationwide 5G system or network (block 740). For example, 5G node 502 may be part of a service provider's 5G network that provides certain guarantees, such as quality of service (QoS), service level agreement (SLA), etc., associated with 5G service. If the 5G node is part of a nationwide service (block 740—yes), candidate ranking logic 330 may provide supplemental candidate nodes to ensure coverage inclusion (block 750). For example, candidate ranking logic 330 may ensure that all first tier LTE neighbor nodes are included as candidate nodes. After ensuring that the first tier LTE neighbors are included, or candidate ranking logic 330 determines that the 5G node is not part of nationwide 5G coverage (block 740—no), candidate ranking logic 330 may rank the candidate nodes (block 760). For example, candidate ranking logic 330 may use a combination of factors to rank the candidate nodes. These factors may include average UE communication hit count over a period of time, signal strength (e.g., RSRP), signal quality, distance from the 5G node, etc. In one implementation, the average UE hit count over a period of time may be weighted more heavily than other KPIs, such as RSRP, signal quality and/or distance. In other implementations, the weighting may be equal for each factor or other factors may be weighted more heavily based on the particular implementation and service provider requirements.

In some implementations, anchor ranking logic 330 applies filters to reduce the number of candidate anchor nodes. Filters may, for example, identify an average RSRP of −105 decibel milliwatts (dbm) and identify distance metrics ranging from 200 m or more to 2500 m or more. For example, in one implementation, a candidate anchor node collocated with 5G node 502 and having an RSRP of greater than −105 dbm may be given a rank of 0, which is the highest rank in this example. In this example, a candidate anchor node that has an RSRP of less than −105 dbm and located more than 2500 m from 5G node 502 may be given a rank of 1, a candidate anchor node that has an RSRP of less than −105 dbm and located more than 1200 m from 5G node 502 may be given a rank of 2, a candidate anchor node that has an RSRP of less than −105 dbm and located more than 500 m from 5G node 502 may be given a rank of 3, and a candidate anchor node that has an RSRP of less than −105 dbm and located more than 200 m from 5G node 502 may be given a rank of 4.

Anchor ranking logic 330 may also identify other factors, such as special priorities associated with the ranked candidates (block 770). For example, in one implementation, collocation of a 4G LTE node with a 5G node may be of particular importance. In such a case, a collocated 4G node be ranked with the highest ranking. In other instances, particular frequency bands supported by the candidate nodes may be considered in ranking the candidates. For example, if a particular candidate node does not support a particular frequency band and/or the distance to a particular candidate node in combination with the frequency bands supported by the candidate node does not meet certain criteria, that candidate node may be withdrawn from consideration as an anchor stations.

In some implementations, a particular vendor's 4G node may have limitations with respect to how many 5G nodes for which the 4G node can act as an anchor. In such cases, a particular candidate anchor node may be eliminated from consideration as an anchor node if the 4G node is potentially functioning as an anchor node for too many 5G nodes. In other instances, a particular 5G node may be a 5G node used in a home/residence and may be given particular importance. In such a case, a network engineer may "whitelist" or select an anchor node for the 5G home node. Still further, PCI conflicts may exist between a 4G candidate anchor node and another 4G node having a same PCI value. In such case, a network engineer and/or anchor candidate ranking logic 330 may determine that the conflict may cause problems and eliminate the candidate node from consideration. Further, in some implementations, candidates with UE call records having a low confidence indicator included in the UE call records may be removed from consideration when determining, for example, UE hit count, RSRP and other KPIs.

In each case, anchor ranking logic 330 may filter candidate nodes based on the special priorities and additional considerations discussed above (block 770). Anchor selection logic 340 may then select the anchor node based on the rankings and/or filtering (block 780). For example, anchor selection logic 340 may select the highest ranked anchor node as the anchor node for 5G node 502. In this example, anchor selection logic 340 may select the 4G node having a ranking of 0.

In some implementation, anchor selection logic 340 may forward the selection to the 5G node (e.g., wireless station 120-2) and/or forward the selection to a network engineer responsible for deploying nodes and/or monitoring environment 100.

Implementations described herein identify an anchor station for a 5G base station based on various metrics and/or KPIs associated with the anchor station. Candidate anchor stations may also be filtered based on particular requirements associated with the 5G base station to further facilitate the anchor selection process. As a result, user devices can take advantage of 5G services when the user devices are located in an area where 5G services are available.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to selecting an anchor station for a 5G wireless station that has been deployed in a particular location in a network. In some implementations, the processing described above may be used to select an appropriate location to deploy a 5G wireless station in environment 100 based on the availability of 4G candidate anchor stations. That is, potential locations for a 5G wireless station may be selected, and candidate anchor stations may be ranked based on the selected location of the 5G wireless station. If a particular location of the 5G wireless station results in a more desirable anchor station than another location for the 5G wireless station, the more desirable location may be selected to deploy the 5G wireless station.

Further, while series of acts have been described with respect to FIGS. 6 and 7, the order of the acts and signal flows may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   identifying, in a network, a location of a Fifth Generation (5G) node;
   determining, based on the location of the 5G node and capabilities associated with the 5G node, a plurality of areas around the 5G node, each area corresponding to a bin of a plurality of bins;
   identifying, in at least some of the plurality of bins, candidate anchor nodes for the 5G node;
   ranking the candidate anchor nodes based on parameters associated with the candidate anchor nodes, wherein the parameters include a first parameter corresponding to a total number of communications handled by each candidate anchor node over a period of time and a second parameter corresponding to an average signal strength associated with the communications handled by each candidate anchor node over the period of time; and
   selecting, for the 5G node, an anchor node from the candidate anchor nodes based on the ranking.

2. The method of claim 1, further comprising:
   determining the number of communications handled by each candidate anchor node over the period of time.

3. The method of claim 2, further comprising:
   determining the average signal strength associated with the number of communications handled by each candidate anchor node.

4. The method of claim 1, further comprising:
   determining, for each of the candidate anchor nodes, a distance to the 5G node, and wherein the ranking further comprises:
   ranking each candidate anchor nodes based on the distance to the 5G node.

5. The method of claim 1, wherein the ranking the candidate anchor nodes further comprises:
   assigning a preference to a first candidate anchor node collocated with the 5G node.

6. The method of claim 1, wherein the candidate anchor nodes comprise Fourth Generation Long Term Evolution (4G LTE) nodes.

7. The method of claim 1, further comprising:
   filtering candidate anchor nodes based on a physical cell identifier (PCI) conflict in the network.

8. The method of claim 1, further comprising:
   determining an average distance for a first plurality of candidate anchor nodes to the 5G node;
   applying a multiplier to the average distance to generate a predetermined distance; and
   eliminating at least a first one of the candidate anchor nodes from consideration as the anchor node in response to determining that the distance from the first candidate anchor node to the 5G node is greater than the predetermined distance.

9. The method of claim 1, further comprising:
   assigning, the selected anchor node to the 5G node.

10. A device, comprising:
    at least one processor configured to:
    identify, in a network, a location of a Fifth Generation (5G) node;
    determine, based on the location of the 5G node and capabilities associated with the 5G node, a plurality of areas around the 5G node, each area corresponding to a bin of a plurality of bins;
    identify, in at least some of the plurality of bins, candidate anchor nodes for the 5G node;
    rank the candidate anchor nodes based on parameters associated with the candidate anchor nodes, wherein the parameters include a first parameter corresponding to a total number of communications handled by each candidate anchor node over a period of time and a second parameter corresponding to an average signal strength associated with the communications handled by each candidate anchor node over the period of time; and
    select, for the 5G node, an anchor node from the candidate anchor nodes based on the ranking.

11. The device of claim 10, wherein the at least one processor is further configured to:
    determine the number of communications handled by each candidate anchor node over the period of time.

12. The device of claim 11, wherein the at least one processor is further configured to:
    determine the average signal strength associated with the number of communications handled by each candidate anchor node.

13. The device of claim 10, wherein the at least one processor is further configured to:
    determine, for each of the candidate anchor nodes, a distance to the 5G node, and wherein the ranking further comprises:
    ranking each candidate anchor nodes based on the distance to the 5G node.

14. The device of claim 10, wherein when ranking the candidate anchor nodes, the at least one processor is further configured to:
    assign a preference to a first candidate anchor node collocated with the 5G node.

15. The device of claim 10, wherein the at least one processor is further configured to:
    filter candidate anchor nodes based on at least one of a physical cell identifier (PCI) conflict in the network or a frequency band supported by the candidate anchor node.

16. The device of claim 10, wherein the at least one processor is further configured to:
    assign the selected anchor node to the 5G node.

17. The device of claim 10, wherein the at least one processor is further configured to:
    at least one of send a message identifying the selected anchor node to the 5G node or send a message identifying the selected anchor node to personnel associated with the network.

18. The device of claim 10, wherein the candidate anchor nodes comprise Fourth Generation Long Term Evolution (4G LTE) nodes.

19. A non-transitory computer-readable medium having stored thereon sequences of instructions which, when executed by at least one processor, cause the at least one processor to:
- identify, in a network, a location of a Fifth Generation (5G) node;
- determine, based on the location of the 5G node and capabilities associated with the 5G node, a plurality of areas around the 5G node, each area corresponding to a bin of a plurality of bins;
- identify, in at least some of the plurality of bins, candidate anchor nodes for the 5G node;
- rank the candidate anchor nodes based on parameters associated with the candidate anchor nodes, wherein the parameters include a first parameter corresponding to a total number of communications handled by each candidate anchor node over a period of time and a second parameter corresponding to an average signal strength associated with the communications handled by each candidate anchor node over the period of time; and
- select, for the 5G node, an anchor node from the candidate anchor nodes based on the ranking.

20. The non-transitory computer-readable medium of claim 19, wherein when ranking the candidate anchor nodes, the instructions cause the processor to:
- rank the candidate anchor nodes based on an average signal quality associated with the number of communications or a distance to the 5G node.

* * * * *